United States Patent
Wang et al.

(10) Patent No.: US 12,218,721 B2
(45) Date of Patent: Feb. 4, 2025

(54) SOUNDING REFERENCE SIGNAL (SRS) ANTENNA SWITCHING FOR MULTIPLE TRANSCEIVER USER EQUIPMENT (UE)

(71) Applicant: QUALCOMM Incorporated, San Diego, CA (US)

(72) Inventors: Runxin Wang, San Diego, CA (US); Muhammad Sayed Khairy Abdelghaffar, San Jose, CA (US); Yu Zhang, San Diego, CA (US); Weimin Duan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 18/020,248

(22) PCT Filed: Aug. 7, 2020

(86) PCT No.: PCT/CN2020/107662
§ 371 (c)(1),
(2) Date: Feb. 7, 2023

(87) PCT Pub. No.: WO2022/027544
PCT Pub. Date: Feb. 10, 2022

(65) Prior Publication Data
US 2023/0275629 A1    Aug. 31, 2023

(51) Int. Cl.
*H04B 7/06* (2006.01)
*H04B 7/0404* (2017.01)
*H04L 5/00* (2006.01)

(52) U.S. Cl.
CPC ......... *H04B 7/0604* (2013.01); *H04B 7/0404* (2013.01); *H04L 5/0023* (2013.01); *H04L 5/0051* (2013.01)

(58) Field of Classification Search
CPC ... H04B 7/0604; H04B 7/0404; H04L 5/0023; H04L 5/0051
See application file for complete search history.

(56) References Cited

U.S. PATENT DOCUMENTS

2019/0356445 A1*  11/2019  Manolakos ........... H04L 5/0051
2020/0204316 A1    6/2020  Zhang et al.
(Continued)

FOREIGN PATENT DOCUMENTS

CN    110650485 A    1/2020
WO    2019158064 A1    8/2019

OTHER PUBLICATIONS

International Search Report and Written Opinion—PCT/CN2020/107662—ISA/EPO—Apr. 30, 2021.
(Continued)

*Primary Examiner* — Jaison Joseph
(74) *Attorney, Agent, or Firm* — Seyfarth Shaw LLP/Qualcomm Incorporated

(57) ABSTRACT

A method of wireless communication, by a user equipment (UE) supporting a four transmitter/six receiver (4T6R) antenna configuration, reports a sounding reference signal (SRS) switching capability. The method receives an SRS antenna switching configuration, and performs SRS antenna switching while transmitting multiple SRSs via SRS resources with multiple transmitters for different antenna ports, in accordance with the SRS antenna switching configuration. At least one of the different antenna ports may use at least two of the SRS resources. A quantity of the different antenna ports assigned to each SRS resource may be different for the SRS antenna switching. The UE may sound the different antenna ports an equal number of times, and at least one of the different antenna ports may use at least two of the SRS resources for the SRS antenna switching.

30 Claims, 10 Drawing Sheets

(56) References Cited

U.S. PATENT DOCUMENTS

| | | | | |
|---|---|---|---|---|
| 2022/0174592 A1* | 6/2022 | Zhang | .................. | H04B 7/0693 |
| 2022/0337362 A1* | 10/2022 | Jiang | .................... | H04L 5/0051 |
| 2022/0338027 A1* | 10/2022 | Gao | ................. | H04W 74/0866 |
| 2022/0369214 A1* | 11/2022 | Shi | ....................... | H04B 7/0874 |
| 2023/0047048 A1* | 2/2023 | Liu | ...................... | H04B 7/0417 |
| 2023/0275629 A1* | 8/2023 | Wang | .................. | H04B 7/0604 |
| | | | | 375/262 |

OTHER PUBLICATIONS

LG Electronics: "On SRS Design and Related Operations", 3GPP Draft, 3GPP TSG RAN WG1 NR Ad-Hoc#2, R1-1710298 NR SRS Final, 3rd Generation Partnership Project (3GPP), Mobile Competence Centre, 650, Route Des Lucioles, F-06921 Sophia-Antipolis Cedex, France, vol. RAN WG1, No. Qingdao, P.R. China, Jun. 27, 2017-Jun. 30, 2017, Jun. 26, 2017 (Jun. 26, 2017), XP051299514, 8 Pages.

* cited by examiner

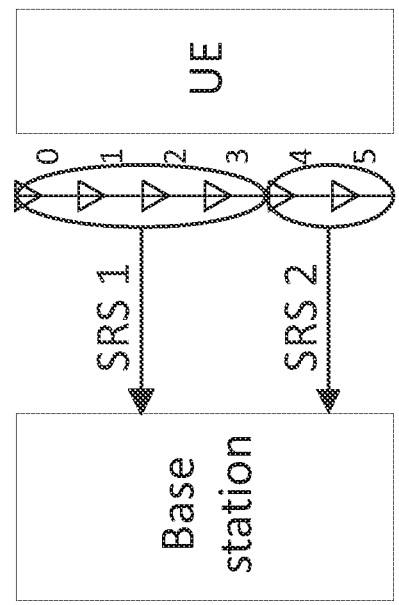

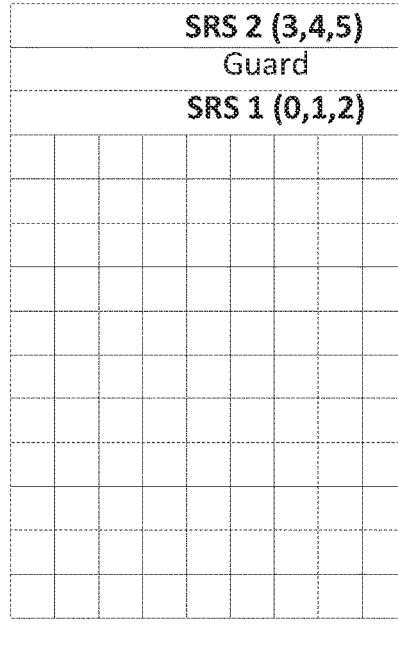

FIG. 7C

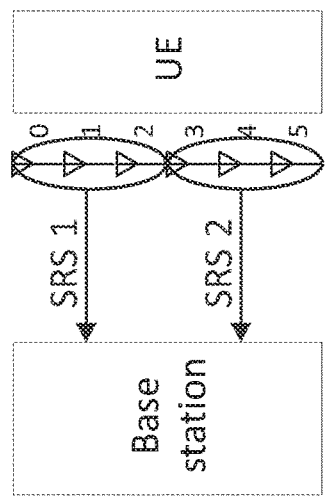

FIG. 7B 6.4.1.4.2  Sequence generation

The sounding reference signal sequence for an SRS resource shall be generated according to $$r^{(p_i)}(n,l') = r_{u,v}^{(\alpha_i,\delta)}(n)$$

$$0 \le n \le M_{sc,b}^{SRS} - 1$$

$$l' \in \{0, 1, \ldots, N_{symb}^{SRS} - 1\}$$

where $M_{sc,b}^{SRS}$ is given by clause 6.4.1.4.3, $r_{u,v}^{(\alpha_i,\delta)}(n)$ is given by clause 5.2.2 with $\delta = \log_2(K_{TC})$ and the transmission comb number $K_{TC}$ is contained in the higher-layer parameter transmissionComb. The cyclic shift $\alpha_i$ for antenna port $p_i$ is given as $$\alpha_i = 2\pi \frac{n_{SRS}^{cs,i}}{n_{SRS}^{cs,max}}$$

$$n_{SRS}^{cs,i} = \left(n_{SRS}^{cs} + \frac{n_{SRS}^{cs,max}(p_i - 1000)}{N_{ap}^{SRS}}\right) \bmod n_{SRS}^{cs,max}$$

FIG. 7A

SOUNDING REFERENCE SIGNAL (SRS) ANTENNA SWITCHING FOR MULTIPLE TRANSCEIVER USER EQUIPMENT (UE)

FIELD OF THE DISCLOSURE

Aspects of the present disclosure generally relate to wireless communications, and more particularly to techniques and apparatuses for 5G new radio (NR) sounding reference signal (SRS) antenna switching for multi-transceiver user equipments (UEs), such as a four transmitter/six receiver (4T6R) UE.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

According to an aspect of the present disclosure, a method performed by a user equipment (UE) that supports a four transmitter/six receiver (4T6R) antenna configuration, reports an SRS switching capability for the 4T6R UE. The method also receives an SRS antenna switching configuration. The method further performs SRS antenna switching while transmitting a number of sounding reference signals (SRSs) via a number of SRS resources with a number of transmitters for a number of different antenna ports, in accordance with the SRS antenna switching configuration.

In another aspect of the present disclosure, an apparatus for wireless communications performed by a user equipment (UE), includes a processor and memory coupled with the processor. Instructions stored in the memory are operable, when executed by the processor, to cause the apparatus to report an SRS switching capability for the 4T6R UE. The apparatus can also receive an SRS antenna switching configuration. The apparatus can further perform SRS antenna switching while transmitting a number of sounding reference signals (SRSs) via a number of SRS resources with a number of transmitters for a number of different antenna ports, in accordance with the SRS antenna switching configuration.

In another aspect of the present disclosure, a 4T6R user equipment (UE) includes means for reporting an SRS switching capability for the UE. The UE also includes means for receiving an SRS antenna switching configuration. The UE further includes means for performing SRS antenna switching while transmitting a number of sounding reference signals (SRSs) via a number of SRS resources with a number of transmitters for a number of different antenna ports, in accordance with the SRS antenna switching configuration.

In another aspect of the present disclosure, a non-transitory computer-readable medium with program code recorded thereon is disclosed. The program code is executed by a 4T6R user equipment (UE) and includes program code to report an SRS switching capability for the UE. The UE also includes program code to receive an SRS antenna switching configuration. The UE further includes program code to perform SRS antenna switching while transmitting a number of sounding reference signals (SRSs) via a number of SRS resources with a number of transmitters for a number of different antenna ports, in accordance with the SRS antenna switching configuration.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description, may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIG. 6A is a block diagram illustrating sounding reference signal (SRS) antenna switching, in accordance with aspects of the present disclosure.

FIG. 6B is a block diagram illustrating a time and frequency grid with sounding reference signal (SRS) resources applied to particular antenna ports, in accordance with aspects of the present disclosure.

FIG. 7A shows sounding reference signal (SRS) sequence generation according to 3GPP TS 38.211 Section 6.4.1.4.2.

FIG. 7B is a block diagram illustrating sounding reference signal (SRS) antenna switching, in accordance with aspects of the present disclosure.

FIG. 7C is a block diagram illustrating a time and frequency grid with sounding reference signal (SRS) resources applied to particular antenna ports, in accordance with aspects of the present disclosure.

DETAILED DESCRIPTION

Figure 1:
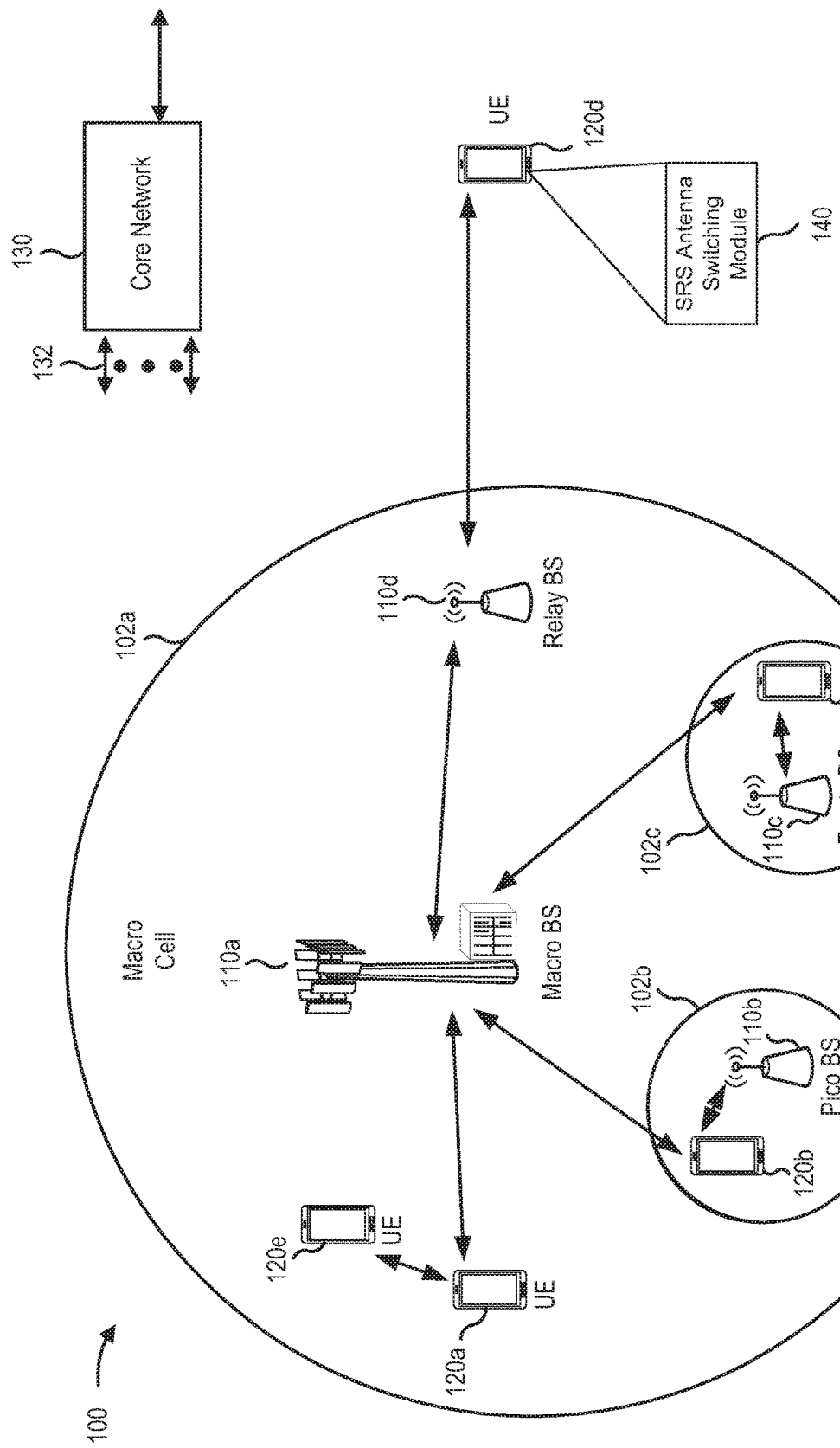
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

As user equipments (UEs) begin to support more receive antennas, a new sounding reference signal (SRS) antenna switching design can be applied to help a base station estimate uplink channels. In order to estimate the uplink (UL) channels, a sounding reference signal (SRS) is transmitted by UEs. For some scenarios, such as with time division duplex (TDD) systems, the uplink channel and the downlink channel are reciprocal. In these scenarios, the base station (gNB) can estimate the downlink channel state information with the knowledge of uplink channel state information. In other words, the SRS can also be used to estimate the downlink channels. However, a number of UE antennas used for uplink and downlink communications may be different. Thus, the channel estimate for the downlink channel may differ from the channel estimate for the uplink channel.

5G new radio (NR) supports NR SRS resources that span one, two, or four adjacent symbols with up to four antenna ports for each SRS resource. All ports of an SRS resource are sounded in each symbol. For some antenna settings, SRS antenna switching (e.g., transmitting SRSs through different antenna ports) is used to cover all the receiver (Rx) antennas. The UE can be configured with one or two SRS resource sets for antenna switching.

According to aspects of the present disclosure, new configurations for SRS switching for 4T6R UEs are presented. Although the present description primarily relates to 4T6R configurations, other configurations with an overlapping different number of Tx antenna ports, such as 4T8R, are also contemplated.

According to an aspect of the present disclosure, using two SRS resources with four Tx antennas for different ports may include one resource set with two resources, or two resource sets, each with one resource. In this configuration, some antenna ports may be sounded more than once. Accordingly, SRS channel estimation accuracy for each port may be different.

In another aspect of the present disclosure, a number of antennas for each SRS resource can be different. In the example of a 4T6R UE, two SRS resources are split among four Tx antennas and two Tx antennas for different ports. In this aspect, one resource is assigned to the four Tx antennas, and another resource is assigned to the two Tx antennas. The two resources may include one resource set with two resources, or two resource sets, each with one resource.

In still another aspect of the present disclosure, two SRS resources are split so that three Tx antennas for different ports are assigned to each resource. In this aspect, one resource set can have two resources, or two resource sets can be configured, each with one resource. According to the present disclosure, a new SRS sequence calculation is presented to accommodate this configuration.

In yet another aspect of the present disclosure, three SRS resources are assigned to four Tx antennas for different ports. The three resources may be from one resource set with three resources. Alternatively, the three resources may be from two resource sets, one resource set with one resource and another resource set with two resources. In yet another option, the three resources may be from three resource sets, each with one resource. In this aspect, with a 4T6R UE, two ports are not sounded for each SRS resource. Moreover, all the ports are sounded twice, using three SRS resources.

In still another aspect of the present disclosure, three SRS resources are assigned to two Tx antennas for different ports. The resources may include one resource set with three resources or three resource sets, each with one resource. In an alternative configuration, the three resources are from two resource sets: one resource set with one resource, and another resource set with two resources. Although the UE may have four Tx antennas in a 4T6R configuration, only two Tx antennas are used for each SRS resource. All antenna ports are sounded once, using three SRS resources.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120*a*, 120*b*, 120*c*) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a PDU session for a network slice. In some cases, the UE 120 may select a network slice based on an application or subscription service. By having different network slices serving different applications or subscriptions, the UE 120 may improve its resource utilization in the wireless communications system 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an SMF.

The AMF may include a default network slice module 138 for determining whether all default S-NSSAI are subject to NSSAA, and initiating NSSAA on all default S-NSSAIs when all default S-NSSAIs are subject to NSSAA. In FIG. 1, the default network slice module 138 is shown as a component of an AMF (not shown) associated with the core network 130.

The UEs 120 may include an SRS antenna switching module 140. For brevity, only one UE 120*d* is shown as including the antenna switching module 140. The antenna switching module 140 may report an SRS switching capability for a 4T6R UE, and receive an SRS antenna switching configuration. The antenna switching module 140 may also perform SRS antenna switching while transmitting sounding reference signals (SRSs) via SRS resources with multiple transmitters for different antenna ports, in accordance with the SRS antenna switching configuration.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
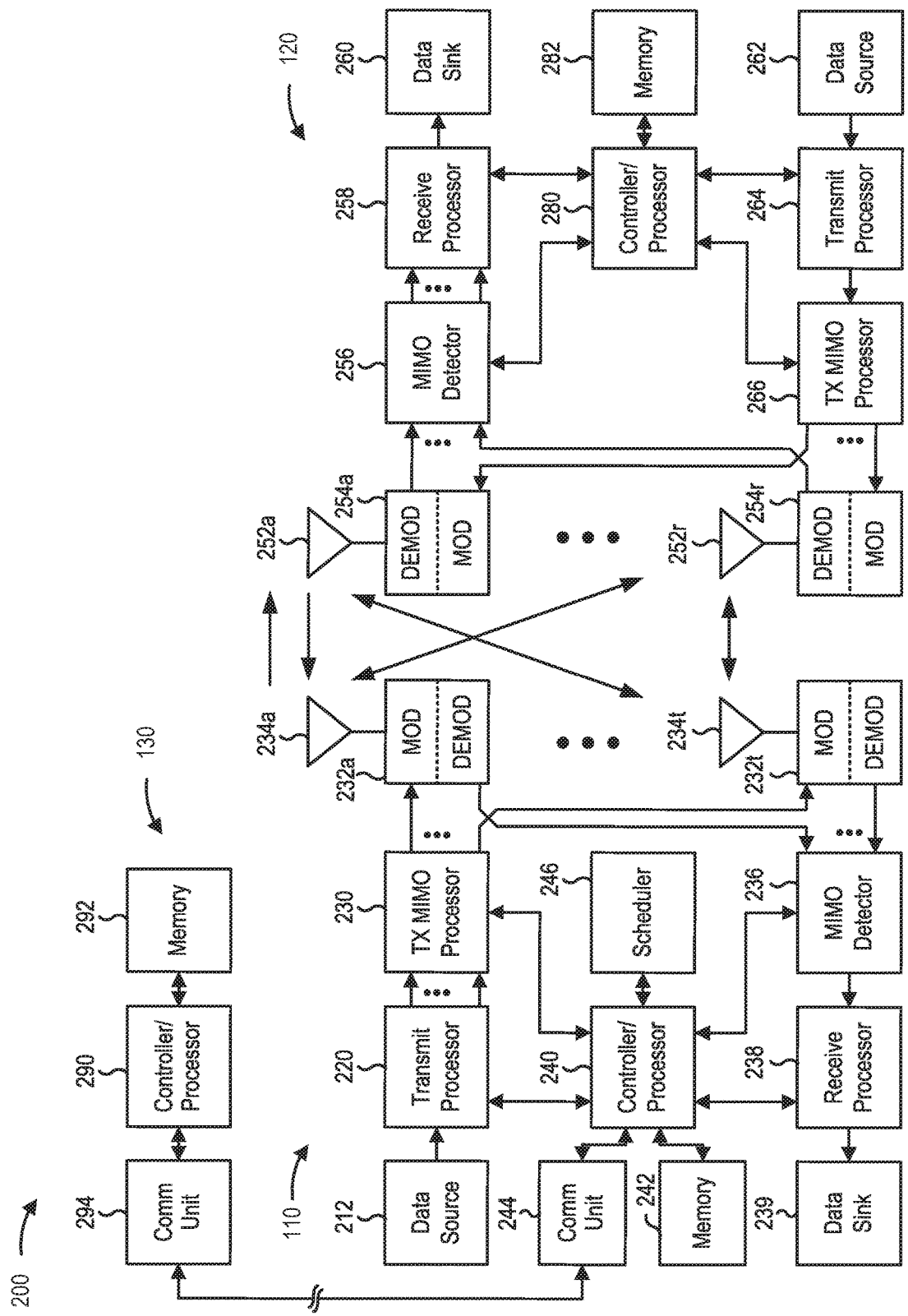
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with SRS antenna switching as described in more detail elsewhere. For example, the controller/processor 240 of the base station 110, the controller/processor 280 of the UE 120, and/or any other component(s) of FIG. 2 may perform or direct operations of, for example, the process of FIG. 10 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving, means for reporting, means for performing, and/or means for sounding. Such means may include one or more components of the UE 120 or base station 110 described in connection with FIG. 2.

As indicated above, FIG. 2 is provided merely as an example. Other examples may differ from what is described with regard to FIG. 2.

Multiple-Input Multiple-Output (MIMO) uses multiple transmit and receive antennas to transmit and receive radio signals simultaneously. This improves communication quality. MIMO takes full advantage of spatial resources to multiply channel capacity and deliver an improved user experience without adding spectrum or increasing transmit power. MIMO demonstrates substantial advantages over traditional antenna technologies. More antennas support more concurrent streams and improve user experience. Four transmitter/six receiver (4T6R) is a configuration for UEs with four transmitters and six receivers, and thus four transmit antenna ports and six receive antenna ports.

As UEs begin to support more receive antennas, a new sounding reference signal (SRS) antenna switching design can be applied to help a base station estimate uplink channels. In order to estimate the uplink (UL) channels, a sounding reference signal (SRS) is transmitted by user equipments (UEs). In the case of channel reciprocity, the base station can also obtain the downlink channels.

5G new radio (NR) supports NR SRS resources that span one, two, or four adjacent symbols with up to four antenna ports for each SRS resource. All ports of an SRS resource are sounded in each symbol. An SRS may only be transmitted in the last six symbols of a slot, after the physical uplink shared channel (PUSCH) in that slot.

Figure 3A:
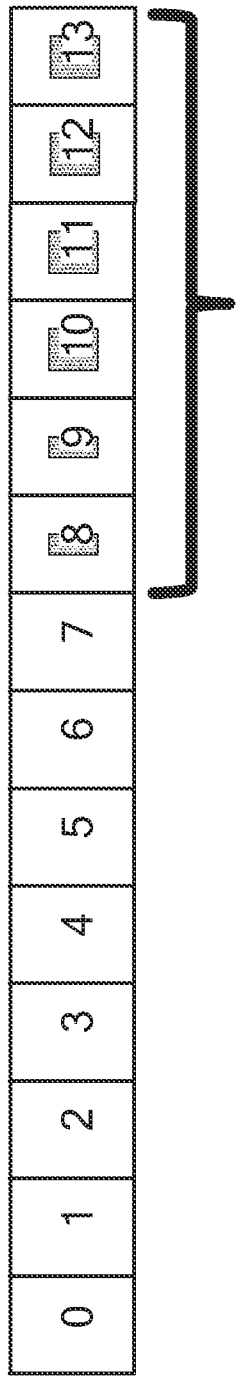
FIG. 3A is a block diagram illustrating a slot with potential sounding reference signal (SRS) resources.

FIG. 3A is a block diagram illustrating a slot with potential sounding reference signal (SRS) resources. As seen in FIG. 3A, only symbols 8-13 are eligible for SRS resource configuration.

An SRS resource set contains a set of SRS resources transmitted by one UE. An SRS resource set may be transmitted aperiodically (downlink control information (DCI)-signaled), semi-persistently, or periodically. A UE may be configured with multiple resources, which may be grouped in an SRS resource set depending on the use case. Example use cases for the SRS resources include antenna switching, codebook-based transmissions, non-codebook based transmissions, and beam management.

Figure 3B:
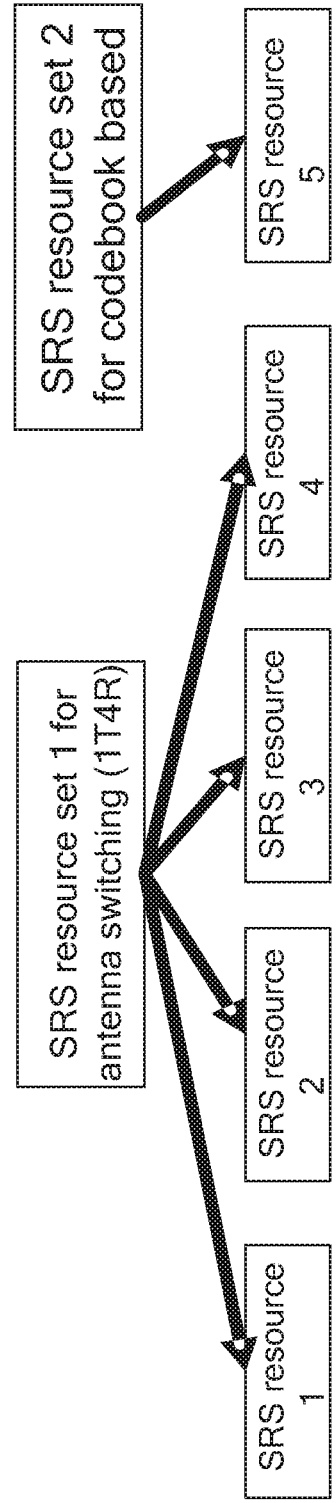
FIG. 3B is a block diagram illustrating sounding reference signal (SRS) resource sets.

FIG. 3B is a block diagram illustrating exemplary sounding reference signal (SRS) resource sets. In FIG. 3B, a first SRS resource set is for antenna switching with a UE supporting a one transmitter/four receiver (1T4R) antenna configuration. There are four SRS resources (SRS resources 1-4) assigned to the first SRS resource set (SRS resource set 1). FIG. 3B also shows a single SRS resource (SRS Resource 5) from a second SRS resource set (SRS resource set 2) assigned to a codebook based use case.

For some scenarios, such as with time division duplex (TDD) systems, the uplink channel and the downlink channel are reciprocal. In these scenarios, the base station (gNB) can estimate the downlink channel state information with the knowledge of uplink channel state information. In other words, SRS can also be used to estimate the downlink channels. However, a number of UE antennas used for uplink and downlink communications may be different. Thus, the channel estimate for the downlink channel may differ from the channel estimate for the uplink channel.

For some antenna settings, SRS antenna switching (e.g., transmitting SRSs through different antenna ports) is used to cover all the receiver (Rx) antennas. The UE can be configured with one or two SRS resource sets for antenna switching.

Figure 4:
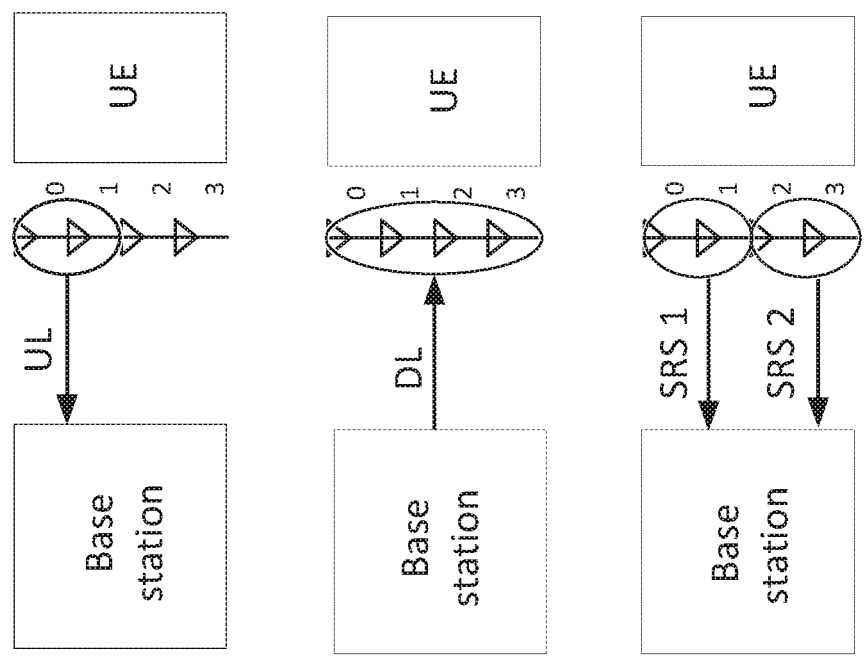
FIG. 4 is a block diagram illustrating sounding reference signal (SRS) antenna switching.

FIG. 4 is a block diagram illustrating sounding reference signal (SRS) antenna switching. In FIG. 4, the UE transmits on the uplink (UL) with two antennas (antenna ports 0 and 1) and receives on the downlink (DL) with four antennas (antenna ports 0-3). Thus, the UE supports a 2T4R antenna configuration. In FIG. 4, the UE sounds the first two antennas (antenna ports 0 and 1) with a first SRS resource (SRS 1). The UE also sounds the second two antennas (antenna ports 2 and 3) with a second SRS resource (SRS 2), in accordance with an antenna switching configuration received from the base station. The antenna switching configuration is based on a reported UE capability, which in this example is a 2T4R capability.

A guard period of Y symbols is placed between the SRS resources of any set transmitted in a same slot. During the guard period, the UE does not transmit any other signal. A number of guard period symbols, Y, is two for 120 kHz subcarrier spacing. Otherwise, the number of guard period symbols, Y, is one.

According to aspects of the present disclosure, new configurations for SRS switching for 4T6R UEs are presented. Although the present description primarily relates to 4T6R configurations, other configurations with an overlapping different number of Tx antenna ports, such as 4T8R, are also contemplated. In one aspect, the 4T6R configuration corresponds to a number of antennas, e.g., six (6), that is not divisible by four (4). The handling of SRS transmission in a case of a number of antennas not-divisible-by-four is described below in various aspects. In various aspects of the present disclosure, SRS switching for 4T6R UEs can include: using two SRS resources with four transmit (four Tx) antennas for different ports, using two SRS resources with four transmit/two transmit (four Tx/two Tx) antennas for different ports, using two SRS resources with three transmit (three Tx) antennas for different ports, using three SRS resources with four Tx antennas for different ports, or using three SRS resources with two Tx antennas for different ports. Each configuration will now be described in more detail.

Using two SRS resources with four Tx antennas for different ports may include one resource set with two resources, or two resource sets, each with one resource. In this configuration, some antenna ports may be sounded more than once. That is, a first set of antenna ports for sounding the first SRS resource partially overlaps a second set of antenna ports for sounding the second SRS resource such that one or more antenna ports are included in both the first set of antenna ports and the second set of antenna ports.

Figures 5A, 5B:
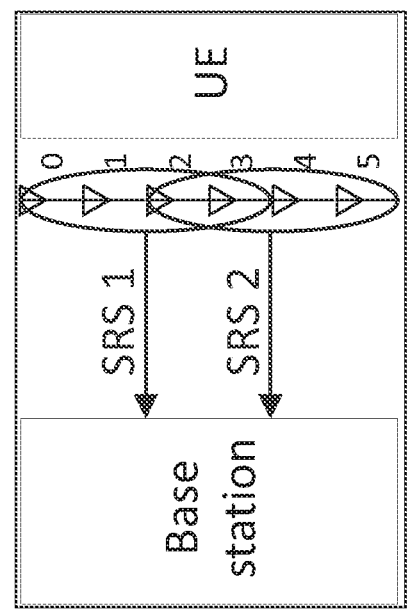
FIG. 5A is a block diagram illustrating sounding reference signal (SRS) antenna switching, in accordance with aspects of the present disclosure.
FIG. 5B is a block diagram illustrating a time and frequency grid with sounding reference signal (SRS) resources applied to particular antenna ports, in accordance with aspects of the present disclosure.

FIG. 5A is a block diagram illustrating sounding reference signal (SRS) antenna switching, in accordance with this aspect of the present disclosure. In this configuration, two ports are covered twice. For example, as seen in FIG. 5A, antenna ports 2 and 3 are each sounded twice (e.g., using first and second SRS resources for antenna switching). That is, antenna ports 0-3 are sounded with a first SRS resource (SRS 1), whereas antenna ports 2-5 are sounded with a second SRS resource (SRS 2). Antenna ports 0, 1, 4, and 5 are each covered only once. Accordingly, SRS channel estimation accuracy for each port may be different.

FIG. 5B is a block diagram illustrating a time and frequency grid with sounding reference signal (SRS) resources applied to particular antenna ports, in accordance with this aspect of the present disclosure. In the example shown in FIG. 5B, one resource set, having two resources, is configured. As seen in FIG. 5B, the sounding reference signals are transmitted during symbols 11 and 13. More specifically, the SRS signals associated with the first SRS resource (SRS 1) are sounded during symbol 11 for antenna ports 0, 1, 2, and 3. The SRS signals associated with the second SRS resource (SRS 2) are sounded during symbol 13 for antenna ports 2, 3, 4, and 5. A one symbol gap occurs during symbol 12.

In another aspect of the present disclosure, a number of antennas for each SRS resource can be different. In the example of a 4T6R UE, two SRS resources are used with four Tx and two Tx antennas for different ports. In this aspect, one resource is assigned to the four Tx antennas, and another resource is assigned to the two Tx antennas. The two resources may include one resource set with two resources, or two resource sets, each with one resource. There is no overlap in this aspect.

FIG. 6A is a block diagram illustrating sounding reference signal (SRS) antenna switching, in accordance with this aspect of the present disclosure. As seen in FIG. 6A, antenna ports 0, 1, 2, and 3 are each sounded with a first SRS resource (SRS 1), whereas antenna ports 4 and 5 are sounded with a second SRS resource (SRS 2). Because the number of antennas assigned to each SRS resource is different, the transmission power of each port in the four Tx SRS antennas and two Tx SRS antennas may be different. Consequently, the SRS channel estimation accuracy for each port may be different.

FIG. 6B is a block diagram illustrating a time and frequency grid with sounding reference signal (SRS) resources applied to particular antenna ports, in accordance with this aspect of the present disclosure. In the example shown in FIG. 6B, one resource set, having two resources, is configured. As seen in FIG. 6B, the sounding reference signals occur during symbols 11 and 13. More specifically, the SRS signals associated with the first SRS resource (SRS 1) are sounded during symbol 11 for antenna ports 0, 1, 2, and 3. The SRS signals associated with the second SRS resource (SRS 2) are sounded during symbol 13 for antenna ports 4 and 5. A one symbol gap occurs during symbol 12.

In another aspect of the present disclosure, two SRS resources are split so that three Tx antennas for different ports are assigned to each resource. In this aspect, one resource set can have two resources, or two resource sets can be configured, each with one resource. However, according to the current specification, calculation of cyclic shifts $\alpha_i$ for each port of the SRS is not divisible for comb 2 ($n_{SRS}^{cs,max}=8$), where $n_{SRS}^{cs,max}$ is a maximum number of antenna ports for SRS cyclic shifts. In other words, the maximum number of antenna ports used in calculating the cyclic shifts is not divisible by the actual number of antenna ports present (six in the example of a 4T6R UE). Thus, the cyclic shift cannot be calculated. FIG. 7A shows the current calculation according to 3GPP TS 38.211 Section 6.4.1.4.2. In particular, equation 1 defines cyclic shifts $\alpha_i$ for each port of the SRS that is not divisible for comb 2 ($n_{SRS}^{cs,max}=8$).

$$\alpha_i = 2\pi \frac{n_{SRS}^{cs,i}}{n_{SRS}^{cs,max}}, \qquad (1)$$

$$\text{where } n_{SRS}^{cs,i} = \left( n_{SRS}^{cs} + \frac{n_{SRS}^{cs,max}(p_i - 1000)}{N_{ap}^{SRS}} \right) \bmod n_{SRS}^{cs,max}$$

According to the present disclosure, a new calculation is presented, as seen in equation (2) below, where $$\left\lceil \frac{n_{SRS}^{cs,max}}{N_{ap}^{SRS}} \right\rceil$$

is a ceiling function of a ratio of a maximum number of cyclic shifts, $n_{SRS}^{cs,max}$, to a number of antenna ports given by a higher layer parameter, $N_{ap}^{SRS}$ $$\alpha_i = 2\pi \frac{n_{SRS}^{cs,i}}{n_{SRS}^{cs,max}}, \quad (2)$$

$$n_{SRS}^{cs,i} = \left( n_{SRS}^{cs} + \left\lceil \frac{n_{SRS}^{cs,max}}{N_{ap}^{SRS}} \right\rceil (p_i - 1000) \right) \mod n_{SRS}^{cs,max}$$

In the present example, the value of $N_{ap}^{SRS}$ is three. The ratio $$\frac{n_{SRS}^{cs,i}}{n_{SRS}^{cs,max}}$$

is a cyclic shift ratio for the ith port. The parameter $n_{SRS}^{cs,i}$ is the number of cyclic shifts for the ith port. The cyclic shift is used to change phase when generating the SRS sequence. In other words, with three transmit antennas a quantity of cyclic shifts for each antenna port is based on a ceiling function applied to a relationship between a maximum number of cyclic shifts, $n_{SRS}^{cs,max}$, and a number of antenna ports given by a higher layer parameter, $N_{ap}^{SRS}$. Because the new equation (2) will not change the values for other divisible cases (e.g., 2T2R, 4T4R, etc.), in addition to this case with three antennas assigned to each SRS resource, equation 2 can be used for all cases.

FIG. 7B is a block diagram illustrating sounding reference signal (SRS) antenna switching, in accordance with this aspect of the present disclosure. As seen in FIG. 7B, antenna ports 0, 1, and 2 are each sounded with a first SRS resource (SRS 1), whereas antenna ports 3, 4, and 5 are sounded with a second SRS resource (SRS 2). There is no overlap shown in the example of FIG. 7B.

FIG. 7C is a block diagram illustrating a time and frequency grid with sounding reference signal (SRS) resources applied to particular antenna ports, in accordance with this aspect of the present disclosure. In the example shown in FIG. 7C, one resource set, having two resources, is configured. As seen in FIG. 7C, the sounding reference signals occur during symbols 11 and 13. More specifically, the SRS signals associated with the first SRS resource (SRS 1) are sounded during symbol 11 for antenna ports 0, 1, and 2. The SRS signals associated with the second SRS resource (SRS 2) are sounded during symbol 13 for antenna ports 3, 4, and 5. A one symbol gap occurs during symbol 12.

In yet another aspect of the present disclosure, three SRS resources are assigned to four Tx antennas for different ports. The three resources may be from one resource set with three resources. Alternatively, the three resources may be from two resource sets, one resource set with one resource and another resource set with two resources. In yet another option, the three resources may be from three resource sets, each with one resource. In this aspect, with a 4T6R UE, two ports are not sounded for each SRS resource. Moreover, all the ports are sounded twice. In this aspect, a first set of antenna ports for sounding the first SRS resource partially overlaps a second set of antenna ports for sounding the second SRS resource such that one or more antenna ports are included in both the first set of antenna ports and the second set of antenna ports. Similarly, the second set of antenna ports partially overlaps with a third set of antenna ports, and the third set of antenna ports partially overlaps with the first set of antenna ports.

Figures 8A, 8B:
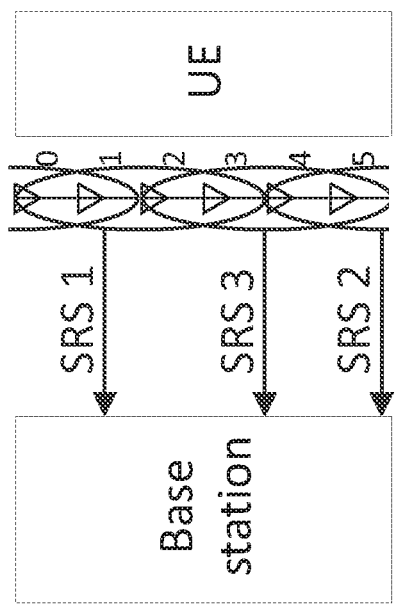
FIG. 8A is a block diagram illustrating sounding reference signal (SRS) antenna switching, in accordance with aspects of the present disclosure.
FIG. 8B is a block diagram illustrating a time and frequency grid with sounding reference signal (SRS) resources applied to particular antenna ports, in accordance with aspects of the present disclosure.

FIG. 8A is a block diagram illustrating sounding reference signal (SRS) antenna switching, in accordance with aspects of the present disclosure. As seen in FIG. 8A, antenna ports 0, 1, 2 and 3 are each sounded with a first SRS resource (SRS 1), antenna ports 4, 5, 1 and 2 are sounded with a second SRS resource (SRS 2), and antenna ports 2, 3, 4, and 5 are sounded with a third SRS resource (SRS 3). In this example, each SRS resource is assigned to four antenna ports. All antenna ports are sounded twice, using three SRS resources.

FIG. 8B is a block diagram illustrating a time and frequency grid with sounding reference signal (SRS) resources applied to particular antenna ports, in accordance with this aspect of the present disclosure. In the example shown in FIG. 8B, one resource set, having three resources, is configured. As seen in FIG. 8B, the sounding reference signals occur during symbols 9, 11, and 13. More specifically, the SRS signals associated with the first SRS resource (SRS 1) are sounded during symbol 9 for antenna ports 0, 1, 2, and 3. The SRS signals associated with the second SRS resource (SRS 2) are sounded during symbol 11 for antenna ports 4, 5, 0, and 1. The SRS signals associated with the third SRS resource (SRS 3) are sounded during symbol 13 for antenna ports 2, 3, 4, and 5. A one symbol gap occurs during symbol 10 and another one symbol gap occurs during symbol 12.

In still another aspect of the present disclosure, three SRS resources are assigned to two Tx antennas for different ports. The resources may include one resource set with three resources or three resource sets, each with one resource. In an alternative configuration, the three resources are from two resource sets: one resource set with one resource, and another resource set with two resources. Although the UE may have four Tx antennas in a 4T6R configuration, only two Tx antennas are used for each SRS resource, in this aspect. In this aspect, here is no overlap.

Figures 9A, 9B:
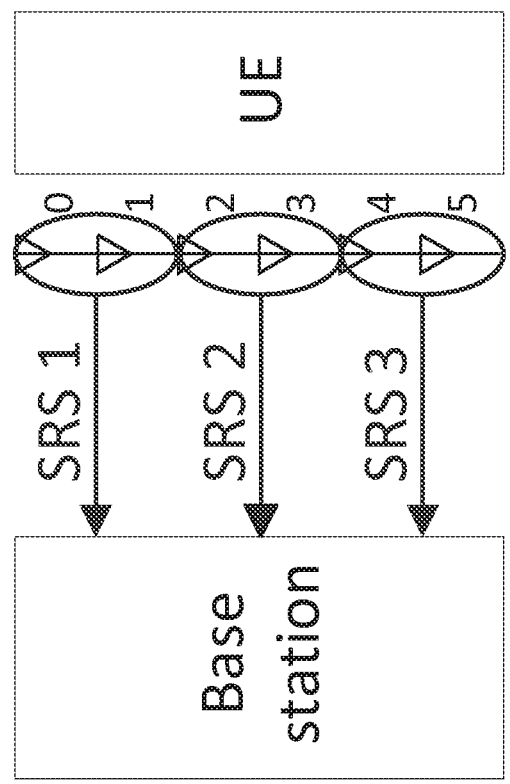
FIG. 9A is a block diagram illustrating sounding reference signal (SRS) antenna switching, in accordance with aspects of the present disclosure.
FIG. 9B is a block diagram illustrating a time and frequency grid with sounding reference signal (SRS) resources applied to particular antenna ports, in accordance with aspects of the present disclosure.

FIG. 9A is a block diagram illustrating sounding reference signal (SRS) antenna switching, in accordance with aspects of the present disclosure. As seen in FIG. 9A, antenna ports 0 and 1 are each sounded with a first SRS resource (SRS 1), antenna ports 2 and 3 are sounded with a second SRS resource (SRS 2), and antenna ports 4 and 5 are sounded with a third SRS resource (SRS 3). In this example, each SRS resource is assigned to two antenna ports. All antenna ports are sounded once, using three SRS resources.

FIG. 9B is a block diagram illustrating a time and frequency grid with sounding reference signal (SRS) resources applied to particular antenna ports, in accordance with this aspect of the present disclosure. In the example shown in FIG. 9B, one resource set, having three resources, is configured. As seen in FIG. 9B, the sounding reference signals occur during symbols 9, 11, and 13. More specifically, the SRS signals associated with the first SRS resource (SRS 1) are sounded during symbol 9 for antenna ports 0 and 1. The SRS signals associated with the second SRS resource (SRS 2) are sounded during symbol 11 for antenna ports 2 and 3. The SRS signals associated with the third SRS resource (SRS 3) are sounded during symbol 13 for antenna ports 4 and 5. A one symbol gap occurs during symbols 10 and 12.

As indicated above, FIGS. 3-9B are provided as examples. Other examples may differ from what is described with respect to FIGS. 3-9B.

Figure 10:
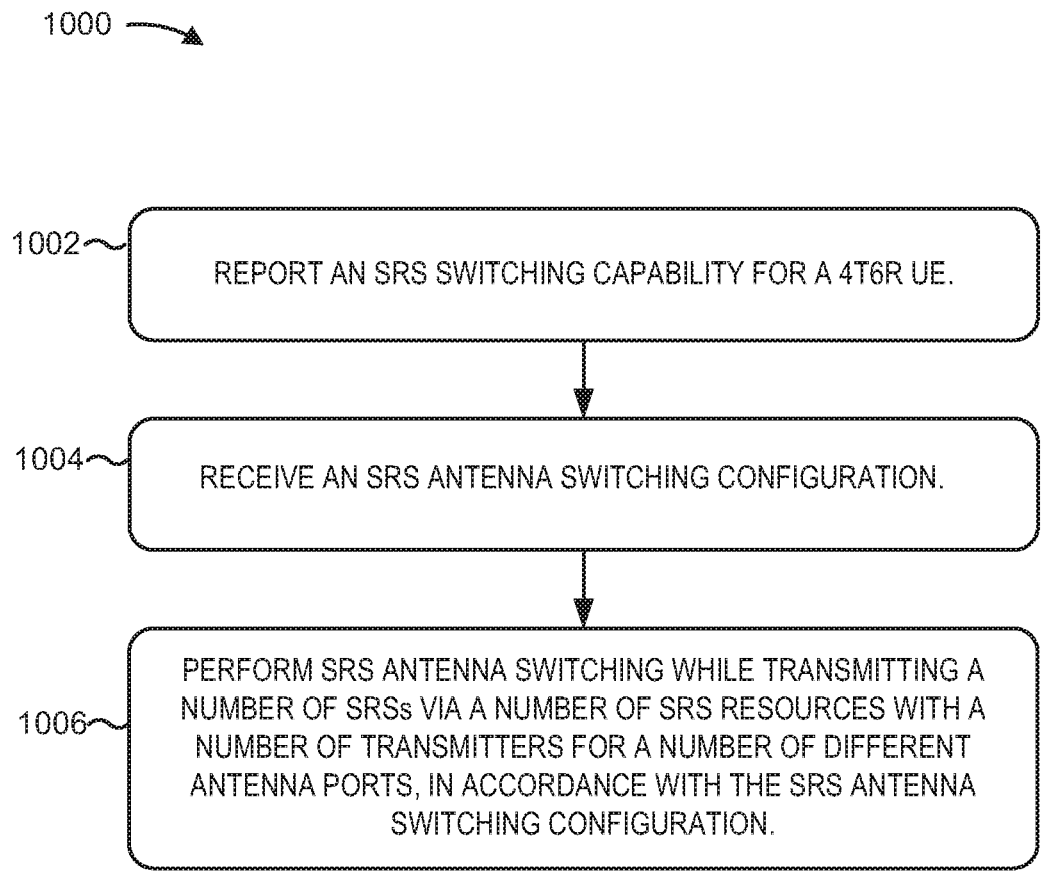
FIG. 10 is a diagram illustrating an example process performed, for example, by a user equipment (UE), in accordance with various aspects of the present disclosure.

FIG. 10 is a diagram illustrating an example process 1000 performed, for example, by a UE, in accordance with various aspects of the present disclosure. The example process 1000 is an example of sounding reference signal (SRS) antenna switching for multiple transceiver user equipment (UE).

As shown in FIG. 10, in some aspects, the process 1000 may include reporting an SRS switching capability for the UE (block 1002). For example, the UE (e.g., using the antenna 252, DEMOD/MOD 254, TX MIMO processor 266, transmit processor 264, controller/processor 280, and/or memory 282) can report an SRS switching capability. In some aspects, the process 1000 may include receiving an SRS antenna switching configuration (block 1004). For example, the UE (e.g., using the antenna 252, DEMOD/MOD 254, MIMO detector 256, receive processor 258, controller/processor 280, and/or memory 282) can receive an SRS antenna switching configuration.

As shown in FIG. 10, in some aspects, the process 1000 may include performing SRS antenna switching while transmitting a number of SRSs via a number of SRS resources with a number of transmitters for a number of different antenna ports, in accordance with the SRS antenna switching configuration (block 1006). For example, the UE (e.g., using the antenna 252, DEMOD/MOD 254, MIMO detector 256, TX MIMO processor 266, receive processor 258, transmit processor 264, controller/processor 280, and/or memory 282) can perform SRS antenna switching.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication, by a user equipment (UE) supporting a four transmitter/six receiver (4T6R) antenna configuration, comprising:
   reporting an SRS switching capability for the 4T6R UE;
   receiving an SRS antenna switching configuration; and
   performing SRS antenna switching while transmitting a plurality of sounding reference signals (SRSs) via a plurality of SRS resources with a plurality of transmitters for a plurality of different antenna ports, in accordance with the SRS antenna switching configuration, wherein a quantity of cyclic shifts for each antenna port is based on a ceiling function applied to a relationship between a maximum number of cyclic shifts, $n_{SRS}^{cs,max}$, and a number of antenna ports given by a higher layer parameter, $N_{ap}^{SRS}$.

2. The method of claim 1, in which at least one of the different antenna ports uses at least two of the plurality of SRS resources for SRS antenna switching.

3. The method of claim 2, in which the plurality of transmitters comprise four transmit antenna ports and the plurality of SRS resources comprise one resource set with two resources.

4. The method of claim 2, in which the plurality of transmitters comprise four transmit antenna ports and the plurality of SRS resources comprise two resource sets, each with one resource.

5. The method of claim 1, in which a quantity of the different antenna ports assigned to each SRS resource is different for SRS antenna switching.

6. The method of claim 5, in which the plurality of transmitters comprise:
   four transmit antennas assigned to a first resource of a resource set of the plurality of SRS resources; and
   two antennas assigned to a second resource of the resource set of the plurality of SRS resources.

7. The method of claim 5, in which the plurality of transmitters comprise:
   four transmit antennas assigned to a first resource set with a first resource of the plurality of SRS resources; and
   two antennas assigned to a second resource set with a second resource of the plurality of SRS resources.

8. The method of claim 1, in which the plurality of transmitters comprise three transmit antennas and the plurality of SRS resources comprise one resource set with two resources.

9. The method of claim 1, in which the plurality of transmitters comprise three transmit antennas and the plurality of SRS resources comprise two resource sets, each with one resource.

10. The method of claim 1, in which the plurality of transmitters comprise three transmit antennas.

11. The method of claim 1, further comprising sounding the different antenna ports an equal number of times, in which at least one of the different antenna ports uses at least two of the plurality of SRS resources for SRS antenna switching.

12. The method of claim 11, in which the plurality of transmit antennas comprise four transmit antennas and the plurality of SRS resources comprise one resource set with three resources.

13. The method of claim 11, in which the plurality of transmit antennas comprise four transmit antennas and the plurality of SRS resources comprise two resource sets, one resource set having one resource and another resource set having two resources.

14. The method of claim 11, in which the plurality of transmit antennas comprise four transmit antennas and the plurality of SRS resources comprise three resource sets, each with one resource.

15. The method of claim 1, in which the plurality of transmit antennas comprise two transmit antennas and the plurality of SRS resources comprise one resource set with three resources.

16. The method of claim 1, in which the plurality of transmit antennas comprise two transmit antennas and the plurality of SRS resources comprise two resource sets, one resource set having one resource and another resource set having two resources.

17. The method of claim 1, in which the plurality of transmit antennas comprise two transmit antennas and the plurality of SRS resources comprise three resource sets, each with one resource.

18. An apparatus for wireless communications performed by a user equipment (UE), comprising:
a processor,
memory coupled with the processor; and
instructions stored in the memory and operable, when executed by the processor, to cause the apparatus:
to report an SRS switching capability for the 4T6R UE;
to receive an SRS antenna switching configuration; and
to perform SRS antenna switching while transmitting a plurality of sounding reference signals (SRSs) via a plurality of SRS resources with a plurality of transmitters for a plurality of different antenna ports, in accordance with the SRS antenna switching configuration, wherein a quantity of cyclic shifts for each antenna port is based on a ceiling function applied to a relationship between a maximum number of cyclic shifts, $n_{SRS}^{cs,max}$ and a number of antenna ports given by a higher layer parameter, $N_{ap}^{SRS}$.

19. The apparatus of claim 18, in which at least one of the different antenna ports uses at least two of the plurality of SRS antenna switching.

20. The apparatus of claim 19, in which the plurality of transmitters comprise four transmit antenna ports and the plurality of SRS resources comprise one resource set with two resources.

21. The apparatus of claim 19, in which the plurality of transmitters comprise four transmit antenna ports and the plurality of SRS resources comprise two resource sets, each with one resource.

22. The apparatus of claim 18, in which a quantity of the different antenna ports assigned to each SRS resource is different for SRS antenna switching.

23. The apparatus of claim 22, in which the plurality of transmitters comprise:

four transmit antennas assigned to a first resource of a resource set of the plurality of SRS resources; and
two antennas assigned to a second resource of the resource set of the plurality of SRS resources.

24. The apparatus of claim 22, in which the plurality of transmitters comprise:
four transmit antennas assigned to a first resource set with a first resource of the plurality of SRS resources; and
two antennas assigned to a second resource set with a second resource of the plurality of SRS resources.

25. The apparatus of claim 18, in which the plurality of transmitters comprise three transmit antennas and the plurality of SRS resources comprise one resource set with two resources.

26. The apparatus of claim 18, in which the plurality of transmitters comprise three transmit antennas and the plurality of SRS resources comprise two resource sets, each with one resource.

27. The apparatus of claim 18, in which the plurality of transmitters comprise three transmit antennas.

28. The apparatus of claim 18, in which the processor causes the apparatus to sound the different antenna ports an equal number of times, in which at least one of the different antenna ports uses at least two of the plurality of SRS resources for SRS antenna switching.

29. A user equipment (UE) for wireless communication supporting a four transmitter/six receiver (4T6R) antenna configuration, comprising:
means for reporting an SRS switching capability for the 4T6R UE;
means for receiving an SRS antenna switching configuration; and
means for performing SRS antenna switching while transmitting a plurality of sounding reference signals (SRSs) via a plurality of SRS resources with a plurality of transmitters for a plurality of different antenna ports, in accordance with the SRS antenna switching configuration, wherein a quantity of cyclic shifts for each antenna port is based on a ceiling function applied to a relationship between a maximum number of cyclic shifts, $n_{SRS}^{cs,max}$, and a number of antenna ports given by a higher layer parameter, $N_{ap}^{SRS}$.

30. A non-transitory computer-readable medium having program code recorded thereon, the program code executed by a user equipment (UE) and comprising:
program code to report an SRS switching capability for the 4T6R UE;
program code to receive an SRS antenna switching configuration; and
program code to perform SRS antenna switching while transmitting a plurality of sounding reference signals (SRSs) via a plurality of SRS resources with a plurality of transmitters for a plurality of different antenna ports, in accordance with the SRS antenna switching configuration, wherein a quantity of cyclic shifts for each antenna port is based on a ceiling function applied to a relationship between a maximum number of cyclic shifts, $n_{SRS}^{cs,max}$, and a number of antenna ports given by a higher layer parameter, $N_{ap}^{SRS}$.

* * * * *